United States Patent Office 3,304,259
Patented Feb. 14, 1967

3,304,259
ORGANOPOLYSILOXANE GREASES
John H. Wright, Elnora, N.Y., assignor to General Electric Company, a corporation of New York
No Drawing. Filed Dec. 21, 1964, Ser. No. 420,157
14 Claims. (Cl. 252—49.6)

This invention relates to organopolysiloxane grease compositions. More particularly, this invention relates to such greases having fillers formed from organopolysiloxanes having SiH groups and organopolysiloxanes having Si-vinyl groups.

The prior art has shown a large number of fillers for use in greases having organopolysiloxanes as base fluids. Among these fillers are silica, metal soaps, graphites, clays, micas, and organic dyes. Each of these fillers is subject to certain limitations. For example, the silica and organic dye fillers are very hard particles which have a tendency to score the surfaces they are meant to lubricate. The metal soaps have a melting point which is low relative to the organopolysiloxane base fluid so that full advantage is not taken of the high temperature characteristics of the organopolysiloxane. Both the graphites and the organic dyes lend an intense color to the grease which in many applications is extremely undesirable. The graphite additionally has a tendency to absorb acids and, when only a small portion of acid has been absorbed, depolymerization of the organopolysiloxane base fluid begins with the resulting degradation of the grease. Greases formed using clay fillers tend to harden on aging. The greases formed from both the micas and the organic dyes are not as desirable as many other organopolysiloxane greases from the standpoint of bleed. Additionally, the micas, which exist as platelets, have a poor configuration from the standpoint of a good grease.

The use of an organopolysiloxane filler for greases has been suggested in the patent to Browning et al., 2,771,422. The filler is formed by the cohydrolysis of a desired mixture of methyltrichlorosilane, dimethyldichlorosilane, and trimethylchlorosilane, followed by a subsequent heating step in the presence of a "silicone liquid" which is stable at temperatures up to about 550° F. The patentees here note that unless the gel is prepared in the presence of this stable silicon liquid the manufacture of smooth greases is difficult, if not impossible. The only organopolysiloxane fluid which meets these thermal stability requirements is phenylmethylpolysiloxane. While it is disclosed that a large number of other organopolysiloxane fluids may be blended with the gel so formed, in each case the presence of a large amount of the phenylmethyl fluid is a necessity. Thus, the ability to form greases having a single organopolysiloxane fluid other than the phenylmethyl fluid is impossible and incompatible systems result, in many cases, when other organopolysiloxane fluids are so blended. Additionally, because of the nature of the reaction used to form the gel, the size, molecular weight, and hardness of the organopolysiloxane gel is difficult to control in spite of control of the reaction mixture.

In accordance with the present invention, it has unexpectedly been discovered that a filler for organopolysiloxane greases can be formed from other organopolysiloxanes, but formed by a procedure which allows control of the particle size, molecular weight, structure, and degree of cross-linking. This filler avoids the problems inherent in the aforementioned fillers, that is, particle hardness, instability at intermediate temperatures below the point of instability of the organopolysiloxane base fluid, color, a tendency to harden on aging, and excessive bleed.

Briefly, the organopolysiloxane grease of the present invention comprises at elast one organopolysiloxane base fluid selected from the class consisting of a first organopolysiloxane fluid having the formula:

(1) $\qquad R_e SiO_{4-e/2}$ a second organopolysiloxane fluid having the formula:

(2) $\qquad R_n H_m SiO_{4-n-m/2}$ and a third organopolysiloxane fluid having the formula:

(3) $\qquad R_p Vi_q SiO_{4-p-q/2}$ and a filler formed by the addition of the SiH groups of the second organopolysiloxane fluid across the silicon-bonded vinyl groups of the third organopolysiloxane fluid, in the presence of a platinum catalyst at an elevated temperature, the filler being an organopolysiloxane material having silethylene linkages of the structure:

$$\equiv Si-CH_2CH_2-Si\equiv$$

In the above formula R is selected from the class consisting of alkyl radicals, substituted alkyl radicals, aryl radicals, and substituted aryl radicals; $m$ is from 0.015 to 1.0, the sum of $n$ and $m$ is from 2.0 to 2.35; $q$ is from 0.015 to 1.0 and the sum of $p$ and $q$ is from 2.0 to 2.3; $e$ from 1.98 to 2.5; and the symbol Vi represents a vinyl group having the structure:

$$-CH=CH_2$$

By proper selection of the values of $m$, $q$, and the chain length of the polymers of the Formulas 2 and 3, the size and structure of the filler material can be accurately controlled.

The amount of SiH material of Formula 2 and SiVi material of Formula 3 which must be present in the final organopolysiloxane grease composition is dependent both upon the molecular weight of the starting materials and upon the number of available SiH groups and SiVi groups. The reaction of a silicon-hydrogen and a silicon-vinyl group, as mentioned, creates a silethylene linkage having the structure:

$$\equiv Si-CH_2CH_2-Si\equiv$$

In order to form a stable grease, not only must there be a minimum number of potential silethylene linkages, that is a minimum number of SiH and SiVi groups available but the amount of material containing these available groups must be within a particular range.

The filler can be formed from organopolysiloxane materials of Formulas 2 and 3 where the SiH groups and SiVi groups are in the stoichiometric ratio of 1:1, or there can be an excess of either of the groups present in the original mixture. There is no limit to the amount of excess vinyl groups which can be available, excess vinyl-containing compounds acting only as a part of the fluid in the final organopolysiloxane grease. (Too great a percentage of available vinyl groups has little adverse effect on the grease, except for possible instability at high temperature, but economies limit the use of excess vinyl-containing fluid.) On the other hand, the number of available SiH groups must be controlled, depending upon the number of SiVi groups present in the original mixture. There can be no more than 200 SiH groups present for each SiVi group, preferably no more than a ratio of 20:1. When the ratio of hydrogen to vinyl groups is higher, instability in the final grease is the result.

As has just been described, there can be an excess of either the SiH material or the SiVi material, with the excess acting as a portion of the organopolysiloxane base fluid, and not as a portion of the filler. Thus, if the number of available SiVi groups in a particular weight of material of Formula 3 is, for example, $12 \times 10^{-3}$ gm.-moles, and the number of available SiH groups available in a material of Formula 2, which is reacted with this SiVi material, is, for example, $24 \times 10^{-3}$ gm.-moles, then 50% of the material of Formula 2 is not a portion of the filler, but is rather a portion of the base fluid. In such a situation, the amount of filler material is the total material of Formula 3 plus 50% of the material of Formula 2. Similarly, if the number of available SiH groups in a particular weight of material of Formula 2 is, for example, $12 \times 10^{-3}$ gm.-moles, and the number of available SiVi groups in a material of Formula 3 is $24 \times 10^{-3}$ gm.-moles, then only 50% of the material of Formula 3 is a portion of the filler, the remainder being a part of the organopolysiloxane base fluid. Then, the filler weight would be all of the material of Formula 2 and 50% of the material of Formula 3. The weight of filler, determined as above, in the final organopolysiloxane grease must be in the range of from 15% to 60%, preferably in the range of from 28% to 40%. The minimum number of potential $\equiv$Si—CH$_2$CH$_2$—Si$\equiv$ groups in the filler must be such that there are $6 \times 10^{-3}$ gm.-moles of these linkages available per hundred grams of final grease, preferably $10 \times 10^{-3}$ gm.-moles of potential $$\equiv Si-CH_2CH_2-Si\equiv$$

groups per 100 gms. of grease. The remainder of the grease, beyond the limits of utilized filler, may be supplied by the excess of material of Formula 2 or of Formula 3, as just described, or can be made up of organopolysiloxane fluids of Formula 1. It will, of course, be obvious that the organopolysiloxane fluid portion of the grease may be a combination of fluids of Formulas 1 and 3, or of fluids of Formulas 1 and 2.

The R groups, in each of the formulas previously described, can be, for example, alkyl groups such as methyl, ethyl, propyl, hexyl, cyclohexyl, cyclopentyl, etc.; substituted alkyl groups such as β-cyanoethyl, γ-cyanopropyl, γ-chloropropyl, β-phenylpropyl, etc.; aryl groups such as phenyl, tolyl, naphthyl, biphenyl, etc.; and substituted aryl groups such as chlorophenyl, bromotolyl, and substituents of the type found in organopolysiloxane lubricant fluids, namely a chlorinated phenyl radical which contains an average of from 3 to 5 chlorine atoms per phenyl nucleus.

The organopolysiloxane materials of the Formula 2 may range from a cyclotetrasiloxane of the formula:

(4) $\qquad$ (RHSiO)$_4$ where R is as previously defined, to an organopolysiloxane fluid of the formula:

(5) $\qquad$ R$_2$HSi—O—(R$_2$SiO)$_x$—SiR$_2$H where R is as previously defined and $x$ is an integral number of up to about 100. Of course, the hydrogen containing material may be a fluid similar to that just described, but containing hydrogen substitutents on more than 2 of the silicon atoms in the chain, such as one having the formula:

(6) $\qquad$ R$_3$SiO—(R'$_2$SiO)$_y$—SiR$_3$ where R is as previously defined, each R' is independently selected from the class consisting of R and hydrogen and $y$ is an integral number of up to about 5,000 which is so selected that $m$ in Formula 1 is from 0.015 to 1.0. Preferably, the SiH containing material is one corresponding to Formula 1, regardless of form, where $m$ is from 0.037 to 0.333.

The organopolysiloxane compound of the Formula 3 can similarly vary from a cyclotetrasiloxane of the formula:

(7) $\qquad$ (RViSiO)$_4$ where R is as previously defined, to an organopolysiloxane fluid of the formula:

(8) $\qquad$ ViR$_2$SiO—(R$_2$SiO)$_a$—RViSiO—SiR$_2$Vi where R is as previously defined and $a$ is an integral number of up to about 150. Again, the vinyl-containing material may be a fluid similar to that just described, but having vinyl substituents on more than 3 of the silicon atoms in the chain, such as one having the formula:

(9) $\qquad$ ViR$_2$SiO—(R''$_2$SiO)$_z$—SiR$_2$Vi where R is as previously defined, each R'' is independently selected from the class consisting of R and Vi, and at least two of the R'' groups are vinyl and $z$ is an integral number of up to about 5,000 which is so selected that $q$ in Formula 2 is from 0.015 to 1.0. Preferably, the Si-vinyl compound is one of Formula 2, regardless of form, where $q$ is from 0.037 to 0.430.

Similar results may be achieved, of course, by the equilibration of a mixture of cyclotetrasiloxanes having SiH and SiVi groups and diorganopolysiloxanes having no SiH or SiVi constituents, so selected that the same proportion and ratio of SiH and SiVi groups are present.

The fluids of Formula 1 which may be blended with the filler formed according to the present invention, are the well-known organopolysiloxane fluids. Some of the more common fluids of the type are dimethylpolysiloxane fluids and phenylmethylpolysiloxane fluids. These fluids of Formula 1 are generally those having viscosities at 25° C. of from 20 centistokes to 10,000 centistokes, but they can have viscosities beyond these limits. Additionally, the organopolysiloxane fluid described by Formula 1 may be a lubricating fluid, as where R represents both a lower alkyl radical, e.g., an alkyl radical containing from 1 to 7 carbon atoms such as methyl, ethyl, butyl, hexyl, etc. radicals, and chlorinated phenyl radicals in which the chlorinated phenyl radicals constitute from 1 to 7 percent of the total number of alkyl and chlorophenyl radicals, and where $e$ has an average value of from 2.01 to 2.5. These lubricating fluids have viscosities of from about 10 to 100,000 centistokes, preferably, from 15 to 5,000 centistokes, when measured at 25° C.

The platinum catalyst which can be used in the present invention are the same as those usable in other olefin-SiH reactions. Among the forms which the platinum catalyst can take are elemental platinum, as shown in patent 2,970,150, Bailey, and platinum-on-charcoal, platinum-on-gamma alumina, platinum-on-silica gel, platinum-on asbestos, and chloroplatinic acid (H$_2$PtCl$_6$.6H$_2$O), as mentioned in patent 2,823,218, Speier. Further, the catalyst can be selected from those having the formula (PtCl$_2$.Olefin)$_2$ and H(PtCl$_3$.Olefin), as described and claimed in the U.S. patent to Bruce A. Ashby, 3,159,601. The olefin described in the previous two formulas can be almost any type of olefin, but it is preferred that the olefin portion of the complex be an alkene having from 2 to 8 carbon atoms, a cycloalkene having from 5 to 7 carbon atoms, or styrene. Specific olefins which are usable as portions of the complexes of the aforementioned Ashby application are ethylene, propylene, the various isomers of butylene, octylene, cyclopentene, cyclohexene, cycloheptene, etc. A further catalyst usable in the process described by the present invention is the platinum chloridecyclopropane complex $(PtCl_2 \cdot C_3H_5)_2$ and claimed in the U.S. patent to Bruce A. Ashby, 3,159,662. Additionally, the catalyst may be a complex formed from chloroplatinic acid with up to 2 moles per gram-atom of platinum of a member selected from the class consisting of alcohols having the formula ZOH, ethers having the formula, ZOZ′ aldehydes having the formula, ZCHO and mixtures of the above as described and claimed in the copending application of Harry F. Lamoreaux, Serial No. 207,076, now Patent No. 3,220,972, filed July 2, 1962, and assigned to the same assignee as the present invention. The substituent Z in the above formulas is a member selected from the group consisting of alkyl radicals having at least 4 carbon atoms, alkyl radicals substituted with an aromatic hydrocarbon radical, and alkyl radicals substituted with an OZ′ group, where Z′ is a member selected from the group consisting of monovalent hydrocarbons free of aliphatic unsaturation and monovalent radicals free of aliphatic unsaturation and consisting of carbon, hydrogen, and oxygen atoms, with each oxygen atom being attached to 2 atoms, at least one of which is a carbon atom and up to 1 of which is a hydrogen atom. The catalyst is used in an amount of 2–1600 p.p.m., as platinum, based on the total of SiVi and SiH materials present. Preferably, the amount is between 10 and 40 p.p.m.

In addition to the components of Formulas 1, 2, and 3, and the platinum catalyst, various other materials can be added to the grease including, for example, a poison for the platinum catalyst. Included among these poisons are strong bases, such as guanidines, sulfur compounds such as mercaptans, phosphorus compounds such as phosphites, and other organic compounds which are miscible with the system. The purpose of the platinum poisons is to prevent subsequent gelling of the grease due to continuing activity of the platinum catalyst. These poisons may be added to the grease system during the milling operation. Other special additives such as oxidation stabilizers, lubricity extenders, viscosity improvers, high temperature stabilizers, etc., as known in the art, can also be added. The order of addition of the SiH compounds and the SiVi compound in the reaction mixture with the platinum catalyst to form the filler is immaterial. All three of the materials may be mixed together and heating begun. The length of time which the materials must be heated to complete the cross-linking reaction, that is the formation of the

groups, varies inversely with the temperaure used to effect the reaction. For example, while the cross-linking will be consummated at room temperature, completion will require from two to three days; at about 45° C., reaction will be completed in about 18 hours; if a temperature of 100° C. is utilized, completion of the cross-linking will require about 2 hours. The reaction time decreases to about 40 minutes when a temperature of 150° C. is employed, while at 200° C., the reaction requires only about 20 minutes. The preferred reaction temperature is the range of from about 190° C. to 200° C. since the nature of the product as a grease filler, is the same regardless of the temperature used to effect cross-linking and the recation, at 190°–200° C., is completed in so relatively short a time. Above about 220° C. oxidation of the reactants and the final cross-linked product result so that the cross-linking reaction must be conducted at a temperature below this maximum. The filler formation may be conducted in the absence of a separate organopolysiloxane base fluid of Formula 1, or if desired all or a part of the separate organopolysiloxane base fluid may be present during the formation of the filler.

Following formation of the filler material by the reaction of the SiH compound, and the SiVi compound, the resulting product is milled on a conventional grease mill to reduce the particle size and form a uniform filler material. The milling of the filler material may be accomplished either in the presence or in the absence of other organopolysiloxane fluids to be used as base fluids. If the milling is accomplished in the absence of such other fluids, after milling the filler may be stored and used as desired by blending with a particular organopolysiloxane base fluid.

The following examples are illustrative of the preparation of the greases of the present invention and should not be considered as limiting in any way the full scope of the invention as covered by the appended claims. All parts are by weight in the examples.

Example 1

A copolymer was formed by equilibrating (a) 2.9 parts of divinyltetramethyldisiloxane, (b) 1.1 parts of methylvinylcyclotetrasiloxane, and (c) 41.0 parts of octamethylcyclotetrasiloxane with 0.05% potassium hydroxide, based on (a) and (b), as a catalyst. This resulted in a fluid equivalent to that of Formula 3 where R is methyl, $q$ is 0.073, and the sum of $p$ and $q$ is 2.05. The filler was formed by reacting the above-described fluid with 5 parts of a methyl hydrogen polysiloxane fluid equivalent to Formula 6, where $y$ was from 10 to 40, averaging 25, one-half of the R′ groups were H and the other half of the R′ groups were methyl, and R was methyl. The catalyst consisted of sufficient chloroplatinic acid to provide 25 p.p.m. of platinum, based on the total weight of SiH and SiVi containing materials. The ingredients were heated at about 150° C. for approximately 45 minutes and resulted in a hard gel. The gel was cooled and ground on a three-roll paint mill using two tight passes and one loose pass to give a fine, fluffy powder. This powder was milled with 50 parts of a dimethylpolysiloxane fluid having a viscosity of approximately 500 centistokes to give a stable grease.

Example 2

A powder equivalent to that formed in Example 1 was blended with equal parts of a phenylmethylpolysiloxane fluid, equivalent to Formula 1 where R is both methyl and phenyl, and $e$ is approximately 2.0, having a viscosity of 150 centistokes. The resulting grease was extremely stable.

Example 3

Equal parts of a powder equivalent to that formed in Example 1 was blended with a chlorophenylmethylpolysiloxane fluid containing an average of 2.22 methyl groups per silicon atom and 0.03 chlorophenyl groups per silicon atom with each phenyl group containing an average of about 4 chlorine atoms. This fluid had a viscosity at 25° C. of about 70 centistokes. The grease formed from this fluid and the powder of Example 1 was extremely stable.

Example 4

A fluid was formed as in Example 1, by copolymerizing, in the presenec of 0.05 percent potassium hydroxide as a catalyst, 0.9 part of divinyltetramethyldisiloxane, 0.4 part of tetramethyltetravinylcyclotetrasiloxane, and 13.5 parts of octamethylcyclotetrasiloxane. This fluid was mixed with 1.9 parts of a methyl hydrogen polysiloxane of Formula 6 as defined in Example 1, 16.7 parts of dimethylpolysiloxane fluid having a viscosity of 1,000 centistokes, and 25 p.p.m. as platinum, based on the SiVi-SiH mixture, of chloroplatinic acid. This mixture was heated for about 25 minutes at 200° C. and resulted in a gel. The gel was milled with 66.6 parts of the same 1,000 centistokes dimethylpolysiloxane fluid used in the original gel and resulted in a stable grease.

Example 5

A mixture was prepared containing 1.5 parts of the SiH fluid of Formula 6 as defined in Example 1, 30 parts of a SiVi fluid of Formula 8 where $a$ was about 100 and each R group was methyl, 68.5 parts of a dimethylpolysiloxane fluid having a viscosity of 500 centistokes, and sufficient chloroplatinic acid to give 200 p.p.m. of platinum, based on the SiVi-SiH mixture. The ingredients were mixed and put in an oven at 200° C. for 20 minutes. After the resulting gel was cooled, it was milled on a three-roll paint mill using three passes, two at a tight setting and one at a loose setting. The resultant grease was tested according to MIL S8660B, a beaker and cone test. The grease showed no bleed, 1.6% evaporation at 200° C. for 24 hours, and worked penetration at 60 cycles of 230.

By comparison MIL S8660B calls for a maximum of 8% bleed, a maximum of 2% evaporation, and a maximum penetration of 310. These specifications are based on available, standard organopolysiloxane greases.

*Example 6*

A mixture was prepared containing 1.4 parts of the SiH fluid described in Example 1, 52.8 parts of the SiVi fluid described in Example 5, and 20 parts per million, as platinum, of chloroplatinic acid. The mixture was heated at 175° C. for approximately 30 minutes. The resultant gel was cooled, and milled as in Example 5. To the fluffy powder which resulted was added 45.8 parts of a methylphenylpolysiloxane fluid having a viscosity of 125 centistokes at 25° C. and an index of refraction of 1.50. The methylphenylpolysiloxane fluid was equivalent to Formula 1 where $e$ was 2.1, approximately 20% of the R groups were phenyl, and the remainder of the R groups were methyl. When tested in accordance with MIL S8660B, the grease formed showed a bleed of 0.95%, evaporation at 200° C. for 24 hours of 1.00%, and a worked penetration at 60 cycles of 196.

*Example 7*

A filler was prepared using the same materials as in Example 6 in an amount of 1.0 part of the SiH fluid and 37.2 parts of the SiVi fluid. After the filler was milled, 61.8 parts of an organopolysiloxane fluid containing chlorophenyl substituents was added. The organopolysiloxane fluid was one of Formula 1 where $e$ was 2.25 of which 2.22 were methyl groups and 0.03 were chlorophenyl groups, each phenyl nucleus containing an average of about 4 chlorine atoms, the fluid having a viscosity at 25° C. of about 70 centistokes. The grease, when tested according to MIL S8660B showed a bleed of 3.5%, 0.86% evaporation at 200° C. for 24 hours, and a worked penetration at 60 cycles of 193.

*Example 8–15*

A series of preferred greases formed according to the present invention are shown in Table I. The table shows the parts by weight of SiH fluid, SiVi fluid and organapolysiloxane fluid of Formula 1, and indicates whether the added fluid was present during the cure of the filler or whether it was milled in following cure. Additionally, the amount of catalyst, in parts per million as platinum, based on the total of SiH and SiVi containing materials, and the length of cure time, in minutes, are shown.

In each case the SiH fluid was that described in Example 1 and the SiVi fluid was that described in Example 5. The added organopolysiloxane fluid in Examples 8 and 9 was a cyanopropylmethylpolysiloxane fluid having a viscosity at 25° C. of 10,000 centistokes and having the average formula:

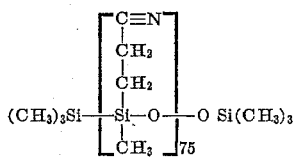

In Example 15 the added organopolysiloxane fluid was a chlorophenylmethylpolysiloxane fluid as described in Example 3. In each of the other examples, the added organopolysiloxane fluid was a dimethylpolysiloxane fluid, equivalent to Formula 1, where R was methyl, and $e$ was approximately 2.0, having a viscosity at 25° C. of 500 centistokes. The filler was cured in each case at 200° C. using chloroplatinic acid as the catalyst.

TABLE I

| Ex. | SiH (Parts) | SiVi (Parts) | Fluid (1) (Parts) | | Catalyst (p.p.m. as Pt) | Cure Time (Min.) |
|---|---|---|---|---|---|---|
| | | | Present | Added | | |
| 8 | 10 | 35 | 55 | | 35 | 30 |
| 9 | 10 | 35 | | 55 | 35 | 30 |
| 10 | 3.3 | 30 | 33.3 | 33.4 | 17.5 | 12 |
| 11 | 5.0 | 28.3 | 33.3 | 33.4 | 17.5 | 12 |
| 12 | 1.4 | 32.5 | 33.9 | 32.2 | 17.5 | 30 |
| 13 | 1.0 | 32.5 | 66.5 | | 17.5 | 20 |
| 14 | 0.8 | 39.2 | 40 | 20 | 55 | 30 |
| 15 | 1.0 | 37.0 | | 62 | 35 | 30 |

The materials of each of the above examples was tested according to MIL S8660B. The results of those tests for bleed, evaporation, and worked penetration at 60 cycles are shown in Table II.

TABLE II

| Example | Bleed | Evaporation | Worked Penetration, 60 Cycles |
|---|---|---|---|
| 8 | 1.61 | 0.85 | 238 |
| 9 | 1.48 | 0.69 | 252 |
| 10 | 5.3 | 1.2 | 219 |
| 11 | 4.0 | 0.8 | 215 |
| 12 | 2.36 | 1.0 | 260 |
| 13 | 0 | 1.6 | 215 |
| 14 | | | 294 |
| 15 | 3.5 | 0.86 | 193 |

*Examples 16–32*

In Table III the same data is shown for Examples 16–32 as was shown for Examples 8–15 in Table I. In each example the SiH fluid, SiVi fluid, and catalyst were the same as described for Examples 8–15. In Example 23, the organopolysiloxane fluid of Formula 1 was the methylphenylpolysiloxane fluid described in Example 2, while in Example 32, the organopolysiloxane fluid was a fluid equivalent to Formula 1 containing both alkyl and phenyl-substituted alkyl groups where approximately 56% of the R groups were methyl, 22% were β-phenylpropyl, and 22% were butyl, and $e$ was approximately 2.2. The fluid in Example 32 had a viscosity at 25° C. of about 1500 centistokes and had the average formula:

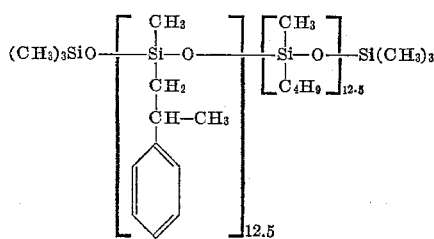

In each of the other examples, the organopolysiloxane of Formula 1 was the dimethylpolysiloxane fluid described in Examples 8–15. Cure times were again at 200° C. Each of the greases produced in the following examples was acceptable.

TABLE III

| Ex. | SiH (Parts) | SiVi (Parts) | Fluid (1) (Parts) Present | Fluid (1) (Parts) Added | Catalyst (p.p.m. as Pt) | Cure Time (Min.) |
|---|---|---|---|---|---|---|
| 16 | 3.3 | 60.0 | 3.3 | 33.4 | 23 | 30 |
| 17 | 0.5 | 99.5 |  |  | 35 | 30 |
| 18 | 15 | 20 | 65 |  | 35 | 30 |
| 19 | 35 | 13 | 50 |  | 35 | 30 |
| 20 | 7.9 | 23.8 | 31.8 | 36.5 | 17.5 | 12 |
| 21 | 1.0 | 49 | 50 |  | 35 | 30 |
| 22 | 0.8 | 41.3 | 42.1 | 15.8 | 9 | 30 |
| 23 | 1.4 | 53.1 |  | 45.5 | 45 | 30 |
| 24 | 46.7 | 20.0 |  | 33.3 | 35 | 30 |
| 25 | 64 | 16 |  | 20 | 35 | 30 |
| 26 | 20 | 46.7 |  | 33.3 | 35 | 30 |
| 27 | 40 | 16.7 |  | 43.3 | 35 | 30 |
| 28 | 1 | 15 | 84 |  | 35 | 30 |
| 29 | 80 | 20 |  |  | 35 | 30 |
| 30 | 13.3 | 53.3 |  | 33.4 | 35 | 30 |
| 31 | 6.7 | 60 |  | 33.3 | 35 | 30 |
| 32 | 1.0 | 49 | 50 |  | 17.5 | 30 |

Several of the greases formed according to the above examples were tested according to MIL S8660B. The results of these tests for bleed, evaporation, and worked penetration at 60 cycles are shown in Table IV.

TABLE IV

| Example | Bleed | Evaporation | Worked Penetration, 60 Cycles |
|---|---|---|---|
| 16 | 1.81 | 1.02 | 279 |
| 20 | 7.5 | 1.1 | 297 |
| 22 |  |  | 234 |
| 23 | 0.95 | 1.0 | 196 |

*Examples 33–37*

Table V shows the same data for Examples 33–37 as was shown in Table I for Examples 8–15. In each of these examples the same SiH fluid, the same SiVi fluid, and the same catalyst as described for Examples 8–15 were used. Where organopolysiloxane fluid of Formula 1 is noted, the fluid is the 500 centistoke dimethylpolysiloxane described for Examples 8–15. Cure was again at 200° C. None of the greases formed from the following examples was acceptable in that they were grainy, non-homogeneous, and showed excessive bleed.

TABLE V

| Ex. | SiH (Parts) | SiVi (Parts) | Fluid (1) (Parts) Present | Fluid (1) (Parts) Added | Catalyst (p.p.m. as Pt) | Cure Time (Min.) |
|---|---|---|---|---|---|---|
| 33 | 90 | 10 |  |  | 35 | 30 |
| 34 | 51 | 6 | 43 |  | 35 | 30 |
| 35 | 0.6 | 11.7 | 87.7 |  | 35 | 30 |
| 36 | 30 | 70 |  |  | 35 | 30 |
| 37 | 20 | 80 |  |  | 35 | 30 |

Thus, an organopolysiloxane grease composition has been shown where the filler is also formed of organopolysiloxane materials. Additionally, the filler is controllable as to size and structure, may be formed at low temperatures, and need not be formed in the presence of another, particularly a phenylmethyl, organopolysiloxane fluid. It is therefore possible to produce an organopolysiloxane grease where all the organic substituents are methyls, thus providing greater lubricity under boundary conditions than with an organopolysiloxane grease which contains phenylmethyl units. Further it is possible to use materials according to the present invention which were not possible in accordance with the teachings of the prior art. For example, as the filler of the present invention may be formed in the absence of an organopolysiloxane fluid, the base fluid used may be less thermally stable but may give properties not possible with other materials. Such a grease might be provided using longer alkyl chains than methyl on the dialkyl polysiloxane fluid, again impossible when the grease must contain a portion of phenylmethylpolysiloxane. Particularly, according to the present invention, it is not necessary to form a grease utilizing two incompatible fluids, a situation in which there is a great tendency for one of the fluids to bleed from the grease. Further, the filler may contain substituents other than alkyl groups, e.g. phenyl groups, thus providing radiation resistance.

The greases of the present invention are particularly valuable in providing lubrication, as between two rubbing surfaces. Additionally, the excellent dielectric properties added by the organosilicon filler make them valuable as protective coatings on electrical connections so as to prevent flashover and arcing.

While specific embodiments of my invention have been shown and described, the invention should not be limited to the specific compositions. It is intended, therefore, by the appended claims, to cover all modifications within the spirit and scope of this invention.

What I claim as new and desire to secure by Letters Patent of the United States is:

1. An organopolysiloxane grease composition comprising at least one organopolysiloxane base fluid selected from the class consisting of a first organopolysiloxane fluid having the formula:

$$R_e SiO_{4-e/2}$$

a second organopolysiloxane fluid having the formula:

$$R_n H_m SiO_{4-n-m/2}$$

and a third organopolysiloxane fluid having the formula:

$$R_p Vi_q SiO_{4-p-q/2}$$

and a filler formed by the addition of the SiH groups of said second organopolysiloxane fluid across the silicon-bonded vinyl groups of said third organopolysiloxane fluid, the filler being an organopolysiloxane material having silethylene linkages; where R is a group selected from the class consisting of alkyl radicals, aryl radicals, substituted alkyl radicals and substituted aryl radicals; $e$ is from 1.98 to 2.5; $m$ is from 0.015 to 1.0, and the sum of $n$ and $m$ is from 2.0 to 2.35; $q$ is from 0.015 to 1.0, and the sum of $p$ and $q$ is from 2.0 to 2.3; there being at least $6 \times 10^{-3}$ gm.-moles of potential silethylene linkages per 100 grams of grease, said filler being present in said grease in an amount, by weight, of from 15% to 60%.

2. The organopolysiloxane grease of claim 1, wherein $m$ is from 0.037 to 0.333, $q$ is from 0.037 to 0.430, said filler material is present in an amount of from 28% to 40%, and has at least $10 \times 10^{-3}$ gm.-moles per 100 grams of grease of potential silethylene linkages.

3. The organopolysiloxane grease composition of claim 1 wherein said organopolysiloxane base fluid consists essentially of said first organopolysiloxane fluid and is dimethylpolysiloxane fluid.

4. The organopolysiloxane grease composition of claim 1, wherein said organopolysiloxane base fluid consists essentially of both said first organopolysiloxane fluid and said second organopolysiloxane fluid, where said first organopolysiloxane fluid is dimethylpolysiloxane fluid, and said second organopolysiloxane fluid is methylhydrogenpolysiloxane fluid.

5. The organopolysiloxane grease composition of claim 1, wherein said organopolysiloxane base fluid consists essentially of both said first organopolysiloxane fluid and said third organopolysiloxane fluid, where said first organopolysiloxane fluid is dimethylpolysiloxane fluid and said third organopolysiloxane fluid is methylvinylpolysiloxane fluid.

6. The organopolysiloxane grease composition of claim 1, where said organopolysiloxane base fluid consists essentially of said first organopolysiloxane fluid and is a tetrachlorophenylmethylpolysiloxane fluid containing from 1 to 7 percent silicon-bonded tetrachlorophenyl substituents.

7. The organopolysiloxane grease composition of claim 1, wherein said organopolysiloxane base fluid consists essentially of both said first organopolysiloxane fluid and said second organopolysiloxane fluid, where said first organopolysiloxane fluid is a tetrachlorophenylmethylpolysiloxane fluid containing from 1 to 7 percent silicon-bonded tetrachlorophenyl substituents and said second organopolysiloxane fluid is methylhydrogenpolysiloxane fluid.

8. The organopolysiloxane grease composition of claim 1, wherein said organopolysiloxane base fluid consists essentially of both said first organopolysiloxane fluid and said third organopolysiloxane fluid, where said first organopolysiloxane fluid is a tetrachlorophenylmethylpolysiloxane fluid containing from 1 to 7 percent of silicon-bonded tetrachlorophenyl substituents and said third organopolysiloxane fluid is a methylvinylpolysiloxane fluid.

9. The organopolysiloxane grease composition of claim 1, wherein said organopolysiloxane base fluid consists essentially of said first organopolysiloxane fluid and contains both alkyl and cyanoalkyl radicals.

10. The organopolysiloxane grease composition of claim 1, wherein said organopolysiloxane base fluid consists essentially of both said first organopolysiloxane fluid and said second organopolysiloxane fluid, where said first organopolysiloxane fluid contains both alkyl radicals and cyanoalkyl radicals and said second organopolysiloxane fluid is a methylhydrogenpolysiloxane fluid.

11. The organopolysiloxane grease composition of claim 1, wherein said organopolysiloxane base fluid consists essentially of both said first organopolysiloxane fluid and said third organopolysiloxane fluid, where said first organopolysiloxane fluid contains both alkyl radicals and cyanoalkyl radicals, and said third organopolysiloxane fluid is a methylvinylpolysiloxane fluid.

12. The organopolysiloxane grease composition of claim 1, wherein said organopolysiloxane base fluid consists essentially of said first organopolysiloxane fluid and contains both alkyl radicals and phenyl-substituted alkyl radicals.

13. The organopolysiloxane grease composition of claim 1, wherein said organopolysiloxane base fluid consists essentially of both said first organopolysiloxane fluid and said second organopolysiloxane fluid, where said first organopolysiloxane fluid contains both alkyl radicals and phenyl-substituted alkyl radicals and said second organopolysiloxane fluid is a methylhydrogenpolysiloxane fluid.

14. The organopolysiloxane grease composition of claim 1, wherein said organopolysiloxane base fluid consists essentially of both said first organopolysiloxane fluid and said third organopolysiloxane fluid, where said first organopolysiloxane fluid contains both alkyl radicals and phenyl-substituted alkyl radicals and said third organopolysiloxane fluid is a methylvinylpolysiloxane fluid.

References Cited by the Examiner
UNITED STATES PATENTS

| | | | |
|---|---|---|---|
| 2,771,422 | 11/1956 | Browning et al. | 252—49.6 |
| 2,863,846 | 12/1958 | Tyler | 260—37 |
| 3,061,545 | 10/1962 | Badger | 252—49.6 |

DANIEL E. WYMAN, *Primary Examiner.*

I. VAUGHN, *Assistant Examiner.*